March 5, 1940.   R. F. BEAN   2,192,845
POWER UNIT
Original Filed Sept. 28, 1937   3 Sheets-Sheet 1
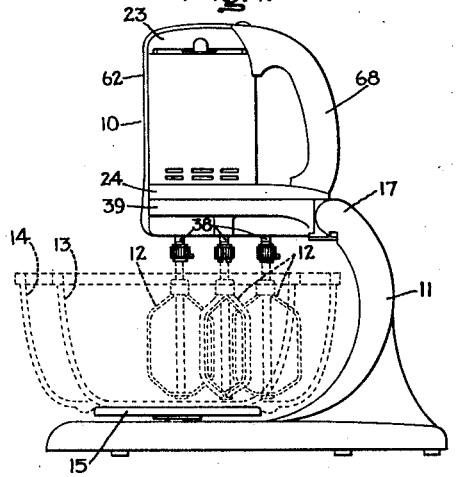
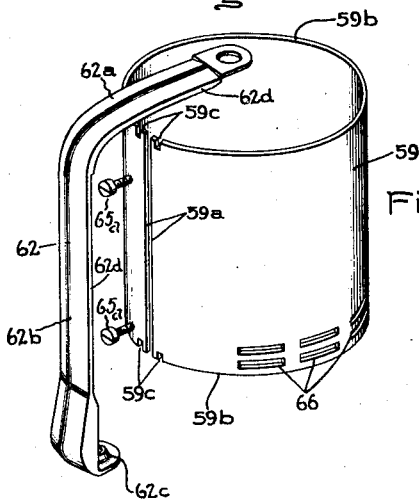
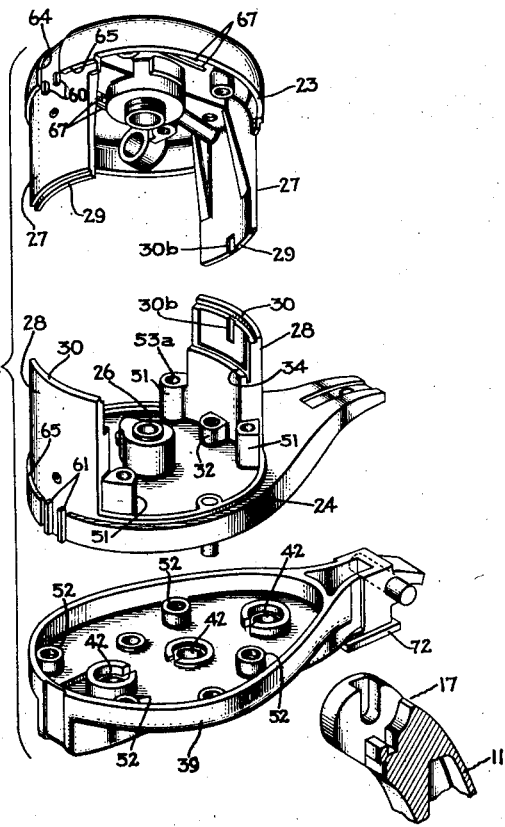
Inventor:
Robert F. Bean,
by Harry E. Dunham
His Attorney.

March 5, 1940.   R. F. BEAN   2,192,845
POWER UNIT
Original Filed Sept. 28, 1937   3 Sheets-Sheet 2
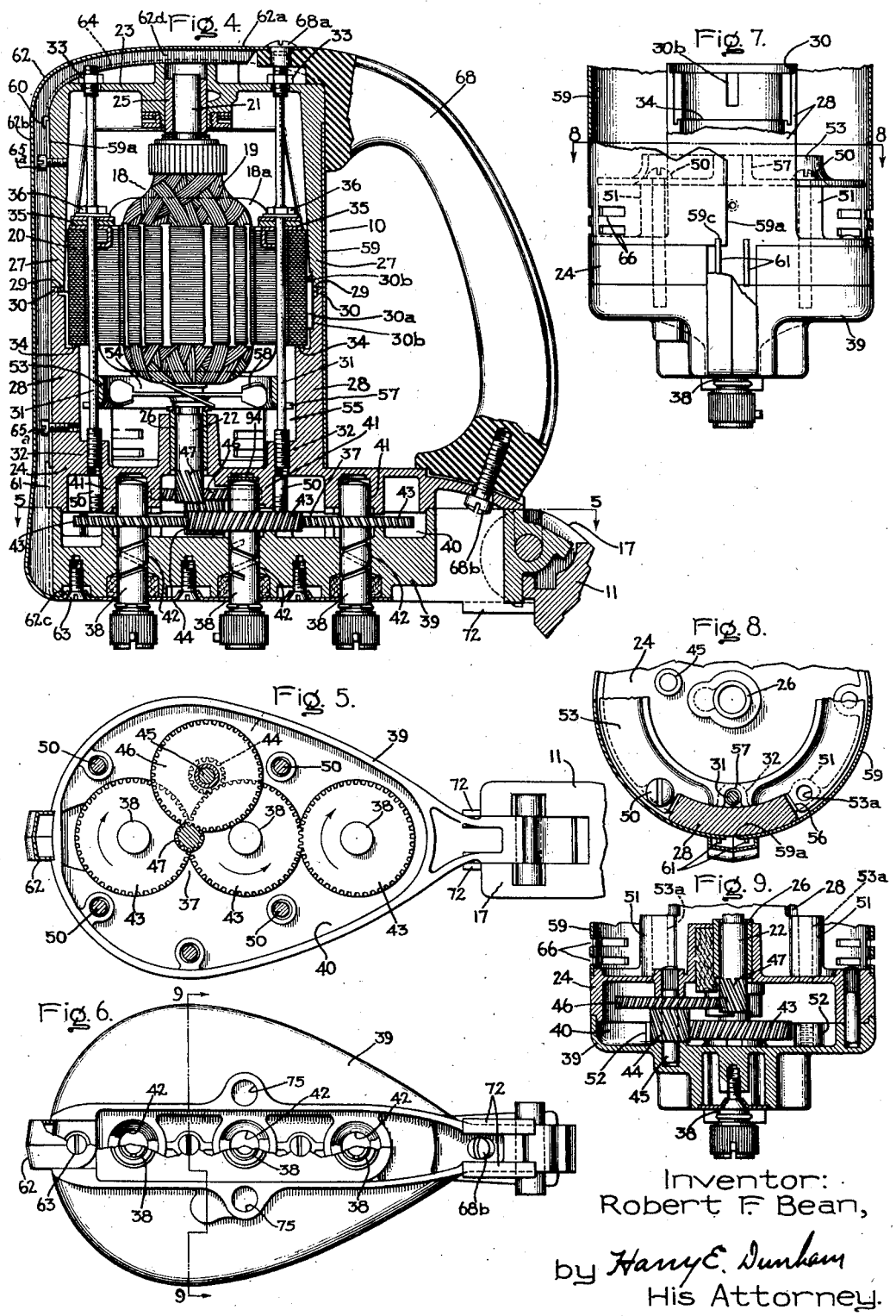
Inventor:
Robert F. Bean,
by Harry E. Dunham
His Attorney.

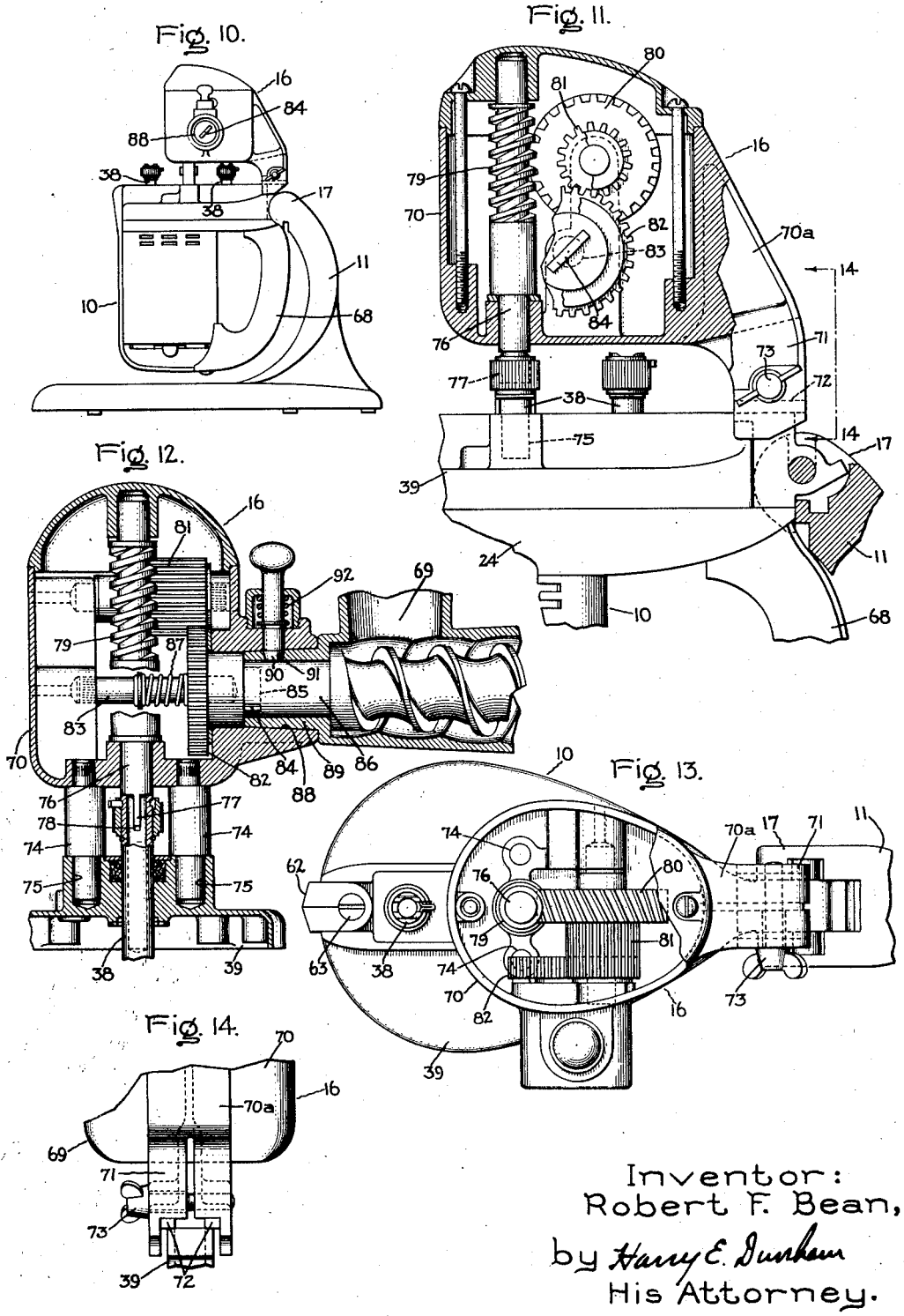

Patented Mar. 5, 1940

2,192,845

UNITED STATES PATENT OFFICE 2,192,845

POWER UNIT

Robert F. Bean, Bridgeport, Conn., assignor to General Electric Company, a corporation of New York Original application September 28, 1937, Serial No. 166,063. Divided and this application September 9, 1938, Serial No. 229,109

10 Claims. (Cl. 172—36)

This invention relates to power units, more particularly to portable electrically driven power units for use in food mixing devices and the like, and it has for its object the provision of an improved device of this character.

This invention contemplates the provision of a power unit which is very light in weight so that it can be manually supported with little effort for mixing and whipping operations in utensils that are removed from the mixing device, such as utensils on a hotplate or a range. It further contemplates improved means for attaching an auxiliary appliance to the power unit.

This application is a division of my copending application, Serial No. 166,063, filed Sept. 28, 1937.

For a more complete understanding of this invention, reference should be had to the accompanying drawings in which Fig. 1 is a side elevation of a food mixing device provided with a power unit arranged in accordance with this invention; Fig. 2 is an enlarged expanded perspective view illustrating certain elements of the power unit arranged in accordance with this invention; Fig. 3 is a view similar to Fig. 2, but illustrating certain other elements of the power unit arranged in accordance with this invention; Fig. 4 is an enlarged elevation chiefly in section of the power unit arranged in accordance with this invention; Fig. 5 is a sectional view taken through the line 5—5 of Fig. 4 and looking in the direction of the arrows; Fig. 6 is a bottom plan view of the power unit of Fig. 4 with parts broken away so as to illustrate certain details of construction; Fig. 7 is a fragmentary front elevation of the power unit of Fig. 6 with parts broken away and parts shown in section so as to illustrate certain details of construction; Fig. 8 is a fragmentary sectional view taken through the line 8—8 of Fig. 7 and looking in the direction of the arrows; Fig. 9 is a fragmentary vertical section taken through the line 9—9 of Fig. 6 and looking in the direction of the arrows; Fig. 10 is a view in side elevation illustrating the power unit mounted on a supporting standard in a working position to operate a gear reduction mechanism all arranged in accordance with this invention; Fig. 11 is an enlarged fragmentary view similar to Fig. 10, having parts shown in section so as to illustrate certain details of construction; Fig. 12 is an enlarged fragmentary central sectional view illustrating the gear reduction mechanism and its relation to the power unit and also its relation to an auxiliary device which it operates, such as a meat grinder; Fig. 13 is a top plan view of the organization shown in Figs. 10 and 11, a part of the gear reduction unit being removed so as to illustrate certain details of construction; and Fig. 14 is a fragmentary elevation along the line 14—14 of Fig. 11 and looking in the direction indicated by the arrows.

Referring to the drawings, this invention has been shown in one form as applied to an electrically driven power unit particularly applicable for use in a food-working device, such as described and claimed in my above-mentioned copending application. This food-working device comprises a power unit 10 arranged in accordance with this invention, mounted upon a suitable supporting base or standard 11. The power unit is arranged to drive three beater elements 12 which are intended to operate in small and large mixing bowls 13 and 14. The mixing bowls are used one at a time and each is arranged to be mounted upon a suitable turntable 15 that is rotatably mounted on the base 11. When the small bowl 13 is used only the two outside beater elements 12 are employed, whereas when the large bowl 14 is used all three beater elements are used in the manner described and claimed in my copending application referred to above. The power unit 10 is arranged to be supported on the standard 11 in each of two positions inverted with relation to each other. In the first position (Figs. 1 and 4), the power unit overhangs the base 11 and is used for operating the beater elements 12 for mixing, whipping, and like food-working operations, and in the second inverted position (Figs. 10-13), it operates certain auxiliary appliances such as a suitable gear reduction mechanism 16. A suitable hinge section 17 is provided between the power unit 10 and the standard 11 so that it may be tilted from its position of Fig. 1 to a non-working position in which the beater elements 12 are elevated from the mixing bowl. This specific hinge structure is described and claimed in my copending application, Serial No. 228,971, filed September 8, 1938.

The power unit 10 comprises a universal series motor 18 having a field winding 18a and an armature winding 19 rotatable within the field winding. Variations in speed are effected by changing the neutral position of the commutating brushes (not shown) with relation to the field poles. The rotatable armature member is provided with shafts 21 and 22 on opposite sides. End cap members 23 and 24 are provided with bearing journals 25 and 26 which journal the shafts 21 and 22 respectively. These end members 23 and 24 are of very light-weight construction consistent with material mechanical strength. Preferably, they will be made as die castings formed of a relatively light strong alloy, such as die-cast aluminum. To increase the lightness of construction, the end members 23 and 24 are secured together and in spaced apart relation by relatively small inwardly projecting elongated fingers 27 and 28 formed on the end members 23 and 24 respectively. These fingers, as shown, are formed in pairs opposite each other and opposite the corresponding fingers of the other end members. The ends of the fingers 27 and 28 abut each other, and as shown, the ends of the members 27 are provided with inner flanges 29 which interlock with outer flanges 30 on the fingers 28. The interlocking between these members is more clearly shown in Fig. 4. The end members 23 and 24 have in general a circular form, and the fingers 27 and 28 will be formed on arcs of circles having the same center as the circles of the end members. The end members are prevented from turning relative to each other by a lug 30a that is received in recesses 30b in the fingers 27 and 28.

The end members 23 and 24 are secured together by a single pair of elongated rods 31 positioned opposite each other and opposite the fingers 27 and 28, as clearly shown in Fig. 4. These rods 31 at their lower ends are threaded in bosses 32 (Figs. 2, 4 and 8) provided for them in the lower end member 24 and are directed through apertures provided for them in the upper end member, as shown in Fig. 4. On the upper ends of the rods are threaded retaining nuts 33.

The fingers 28 of the lower end member have arcuate seats 34 which function to support the field winding frame 20. The field frame is rigidly secured on these seats by means of steel clamping members 35 which are secured to the rods 31 by means of nuts 36 on the rods and over the clamping members, as shown.

The motor shaft 22, as shown, extends through the lower end member 24 to the other side of this member, and on this other side is a gear train 37 which functions to drive a plurality of food-working shafts or spindles 38 which function to drive the beater elements 12. As shown, three shafts 38 are provided, one for each of the beater elements 12. Cooperating with the end member 24 is a gear cap member 39 which is so related to the end member 24 that it defines a gear housing 40 for the gear train, and it also cooperates with the end member 24 to support the shafts 38. For this purpose, the end member and gear cap have alined bearings 41 and 42 which journal the shafts 38. Mounted on and secured to each shaft 38 is a driving gear 43. The gear 43 on the central driving shaft 38 is relatively thicker than the other two and functions to drive them. This central gear 43 in turn is driven by means of a small gear 44 which is rotatably mounted on a fixed shaft 45. The small gear 44 is secured to a gear 46. The gear 46 is connected with a gear thread 47 formed directly on the end of the motor shaft 22 that projects into the gear housing 40. Thus, the motor shaft 22 drives the gear 46 and this gear in its turn drives the central gear 43 that drives the two other outer gears 43. Therefore, when the motor is operating all three shafts 38 are operated at the same speed, the two outer shafts operating in the same direction while the central shaft rotates in a direction opposite to the other two.

As shown, the bearings 41 and 42 cooperate with the associated gears 43 to limit the vertical movement of the gears in the gear housing.

The gear cap 39 is secured directly to the end member 24 by means of four screws 50 which pass down through bosses or enlargements 51 in the end member 24 and which are received in threaded engagement in bosses 52 in the gear cap member 39.

These same screws 50 also function to secure the shroud ring 53 of the fan 54 that is mounted in a fan chamber 55 between the armature and field windings of the motor and the lower cap member 24. As shown, this shroud ring is seated upon the tops of the abutments 51 and it is provided with apertures 53a through which the screws 50 pass so that it is rigidly secured to these abutments by the screws. At the opposite side, the shroud ring 53 is provided with cut-away sections 56 to interlock the ring with the fingers 28, and moreover, it is provided with a second set of cut-away sections 57 which interlock with the rods 31. The function of the interlock is to constrict air flow of the fan at the outside edges of the shroud preventing recirculation of the air within the fan chamber 55. The fan 54 further comprises an impeller 58 mounted directly on the motor shaft 22 within the shroud ring, as shown.

The space between the cap members 23 and 24 is enclosed by a relatively light weight sheet metal shell 59 which is folded around the fingers 27 and 28 so that its two edges 59a are brought relatively close together at the front of the power unit. The upper and lower edges 59b of the member 59 are provided with notches 59c relatively close to the end edges 59a, as shown, and these notches are received in pairs of spaced lugs 60 and 61 provided on the end members 23 and 24 respectively. The member 59 is folded about the end members and fingers and then the notches 59c are snapped over the lugs 60 and 61 so as to prevent separation of the edges 59a. The seam of the edges 59a is covered by means of a band or strap 62 of generally L-shape; the short arm 62a of this band is directed over the upper cap member 23 and is secured at the rear to the rod 31 in a manner to be presently described. The long leg 62b of the L is directed down over the front seam and thence is turned backwardly under the bottom of the gear cap member 39 where it is secured to it by a screw 63. As shown, this section of the band is provided with a reentrant part 62c which is received in an aperture provided for it in the cap member 39. The screw head 63 functions to hold the reentrant part securely in this aperture. The band throughout the length of its two legs 62a and 62b is provided at the edges with inturned flanges 62d, those on the legs 62b engaging the two end portions of the member 59 to prevent springing out of these members, and those on the legs 62a being received in a recess 64 provided for them in the upper cap member. The upper and lower edges 59b of the member 59 are received in seats 65 provided for them in the two end members 23 and 24 respectively. Preferably a pair of screws 65a will be threaded into the fingers 27 and 28 so that their heads clamp the edges 59a of the sleeve 59 to the fingers as shown in Fig. 4.

A series of apertures 66 are provided in the lower part of the casing member 59 and a series of apertures 67 (Fig. 2) are provided through the upper cap member to provide for circulation of air through the chamber in which the motor is located.

The power unit is completed by means of a handle 68 which is secured to the top member 23 through the rear rod 31. As shown, this handle member is provided with a portion which overhangs the top of the member 23 and this portion is secured directly to the rod 31 by means of a nut 68a directed through an aperture provided for it in the handle and received in threaded engagement with the upper end of the rod 31. The nut 68a also is directed through an aperture provided for it in the upper end of the band section 62a, and hence, the nut constitutes a common means for securing both the upper end of the handle 68 and the upper end of the band 62 to the power unit. The lower end of the handle is secured to the lower member 24 by means of a screw 68b. As shown, this lower cap member 24 is provided with a rearwardly projecting portion to which the handle is secured, and which is also that part of the power unit which is hinged to the standard 11.

When it be desired to operate an auxiliary appliance, such as a meat grinder 69 (Fig. 12), the power unit 10 is removed from the standard and is replaced thereon in an inverted position as shown in Figs. 10 and 11. When in this position, it is clear that the driving shafts 38 are accessible from the top of the power unit. Preferably, the central shaft is used to drive the auxiliary appliances. When the power unit 10 is utilized to drive an appliance requiring a considerable amount of power, such as a meat grinder, the auxiliary gear reduction unit 16 is used. This gear reduction unit is provided with a housing 70 which has a rearwardly extending member 70a which is provided with a split section 71 at its lower end. This split section is fitted over panel members 72 provided on the normal under surface of the power unit 10. And the split section 71 is secured on these panels by means of a clamping screw 73 which draws the split section together tightly on the panels 72. The housing 70 at its forward end is provided with a pair of spaced-apart depending pins 74 positioned opposite the central driving shaft 38, as clearly shown in Figs. 12 and 13. These members at their lower ends have reduced sections that are received in sockets 75 provided in the power unit 10. The rigidity of the pins 74 is such that the downwardly extending member 70a may be omitted from the gear reduction unit if desired without seriously affecting the stability or operation of the gear reduction unit.

Mounted within the gear housing 70 is a vertical drive shaft 76 which at its lower end is provided with a tongue 77 which is arranged to be inserted in driving slots 78 in the central drive shaft 38. This effects a driving connection between the shaft 38 and the drive shaft 76. The vertical shaft 76 has a spiral worm 79 which drives a gear 80. This gear in turn drives a spur gear 81. This gear meshes with a gear 82 which is mounted on a shaft 83 arranged generally at right angles to the driving shaft 76. The shaft 83 is not rotary, but is a fixed shaft and the gear 82 is freely rotatable on it. The gear 82 is provided on its outer face with a driving tooth 84 which is arranged to be received in a slot 85 provided for it in the driving shaft 86 of the meat grinder 69. The gear 82 may be moved inwardly axially of the shaft 83 against the bias of a compression spring 87 so that if the shaft 86 be applied to the reduction unit in any but the proper angular position and its tooth 84 is not received in the slot 85, the gear 82 will be pushed back against the bias of the spring 87, and when the power unit subsequently operates the tooth into the correct angular relation with reference to the slot 85, the spring 87 will move the gear 82 to its proper operating position shown in Fig. 12. The reduction housing 70 has a tapered socket 88 which receives a tapered section 89 of the meat grinder 69. The meat grinder is locked in this socket by means of a pin 90 carried by the gear reduction unit and arranged to be received in an aperture 91 provided for it in the meat grinder, as clearly shown in Fig. 12. The pin is normally biased to its locking position by means of a compression spring 92.

The central driving shaft 38 which drives the auxiliary appliance preferably will be provided with a thrust disk bearing 94 (Fig. 4) to take the end thrust on the shaft. As shown, this disk is mounted in the bearing section 41 for the central shaft 38 that is provided in the end cap member 24.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a food-working device and the like, a lightweight portable power unit comprising opposed end cap members having a plurality of spaced mating inwardly extending members engaging each other at their ends to space the cap members apart, means securing said cap members together in said spaced apart relation, a motor unit mounted between said cap members and having bearings for its rotor mounted in them, the shaft of the motor extending through one of said cap members, a gear housing member into which said shaft extends, gear reduction mechanism in said housing member, beater shafts driven from said reduction mechanism, and a light sheet metal shell folded about said inwardly extending members to enclose the space between said cap members and having its two end edges adjacent each other and interlocked with said cap members.

2. In a food-working device and the like, a lightweight power unit comprising a pair of cap members, each having a pair of oppositely positioned spacing members directed toward those of the other cap member and engaging them so as to space said cap members apart, a thin sheet metal member surrounding said spacing members and having its end edges adjacent each other at one side of the unit, the end portions of the member having notches that are received in lugs on the cap members to hold the ends together, a clamping band covering the seam of the two end edges, means securing the band in its position over the seam, a motor housed within said shell, and beater driving shafts driven by said motor.

3. In a food-working device, a lightweight power unit comprising a pair of spaced end members joined by relatively small inwardly projecting arms, a motor in the space between said end members, a relatively thin sheet metal shell closing said space having its end edges brought close to each other, the shell having notches adjacent said edges and received in lugs provided in said end members to prevent separation of the edges, a band covering the seam of said edges and preventing outward movement thereof from the lugs, means securing said band in its position over said seam, and a beater shaft driven by said motor.

4. In a food-working device and the like, a lightweight power unit comprising a pair of die castings defining end members having spacing fingers directed toward each other and interlocking each other at their ends, elongated screws holding said end members together, the fingers in one end member having seats, a motor having a field frame resting on said seats and secured to said screws to prevent movement thereof from the seats, and the motor also having an armature the shaft of which is received in bearings in said end members and the shaft projecting through one of them, a cap cooperating with said latter end member to define a gear chamber, reduction gearing in said chamber connected with said shaft, beating shafts driven from said gearing, and a lightweight shell surrounding said fingers and enclosing said motor field and armature.

5. In a food-working device and the like, a power unit comprising upper and lower end members, each having a pair of fingers directed toward those of the other and interlocking at their ends, elongated screws securing said ends together threaded at their lower ends in the lower end member, seats on the fingers of the lower end member, a motor having its field frame resting on said seats, clamps on said screws holding said field frame onto said seats, the motor also having an armature, bearings in said end member supporting said armature, a cap member below the lower end member cooperating with it to define a gear housing, gearing in said housing driven by said motor, beater shafts driven by said gearing, a fan chamber between said motor and lower end member, a fan in said chamber having an impeller and a shroud around it, the lower end member having seats in which said shroud rests and common fastening means securing said shroud, lower end member and cap member together.

6. In a food-working device and the like, a power unit comprising a driving motor, end members for said motor, the motor shaft passing through one of said end members to the other side, gearing on said other side, a gear cap member cooperating with said one end member to house the gearing, beater shafts mounted in said end and cap members, a fan chamber directly above said one end member, an impeller in said chamber, a shroud for said impeller in said chamber, seats on said one end member receiving said shroud and common fastening means securing said end member, shroud and gear cap together.

7. In a food-working device and the like, a power unit comprising a motor having a field winding and a rotatable armature, end members having bearings supporting said armature for rotation, the armature shaft projecting through one of said end members to the other side, gearing on said other side, a gear cap cooperating with said one end member to define a housing for said gearing, beater shafts driven by said gearing, a plurality of elongated rods securing said end members together, a fan impeller between said end member and said field windings and armature driven by said motor, a shroud for said fan, means on said one end member supporting said shroud, common fastening means securing said one end member, shroud and gear cap member together, and said shroud being interlocked with said rods.

8. In a food-working device and the like, a lightweight portable power unit comprising a motor, end members having bearings supporting the rotor of said motor, the end members having spaced fingers directed toward each other and engaging each other to space the end members apart, means securing said end members together, a sheet folded around said fingers to enclose the space between said end members, and having its end edges close to each other, means for holding said edges against separation, a sealing strip over the seam of said edges, a handle for said power unit, a common fastening device securing one end of each of said strip and handle to said unit, and means securing the other two ends of said strip and handle to said unit.

9. In a food-working device and the like, a lightweight portable power unit comprising end members having spaced fingers directed toward each other and interlocked at the ends, a plurality of elongated rods passing between said end members and securing them together, a motor mounted between said end members, food-working shafts driven by said motor, a thin sheet folded around said fingers to enclose the space between said end members and having its end edges adjacent each other, means preventing separation of said edges, a band sealing the seam of said edges having one end secured to one end of said unit and its other end directed back over the end member at the opposite end, a handle directed between said end members, common fastening means securing one end of said handle and said other end of said band to one of said rods, and means securing the other end of said handle to said unit.

10. In a food-working device and the like, a lightweight portable power unit comprising a motor having a rotor, spaced-apart end members having bearings supporting said rotor and having relatively small spacing fingers that space the end members apart, a sheet folded around said fingers to enclose the space between said end members and having its end edges close to each other, means for holding said edges against separation, a sealing strip covering the seam of said edges, and means securing the ends of said strip to said end members.

ROBERT F. BEAN.